(12) United States Patent
Onizuka et al.

(10) Patent No.: US 6,896,851 B1
(45) Date of Patent: May 24, 2005

(54) WET TYPE FLUE GAS DESULFURIZATION EQUIPMENT

(75) Inventors: Masakazu Onizuka, Hiroshima (JP);
Toru Takashina, Hiroshima (JP);
Takeo Shinoda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/529,257

(22) PCT Filed: Aug. 10, 1999

(86) PCT No.: PCT/JP99/04309

§ 371 (c)(1),
(2), (4) Date: Apr. 11, 2000

(87) PCT Pub. No.: WO00/09243

PCT Pub. Date: Feb. 24, 2000

(30) Foreign Application Priority Data

Aug. 11, 1998 (JP) .......................................... 10-226798

(51) Int. Cl.[7] .......................... B01J 10/00; B01D 53/50; B01D 53/77; B01D 53/34
(52) U.S. Cl. ...................... 422/168; 422/231; 422/224; 422/171; 261/121.1; 239/419.5
(58) Field of Search ............................... 422/168–169, 422/172, 231, 224, 170–171; 285/132.1; 239/419, 419.5; 261/121.1; 423/242.1, 243.03, 243.08

(56) References Cited

U.S. PATENT DOCUMENTS

| 2,479,578 | A | * | 8/1949 | Langvand | 285/132.1 |
| 2,931,580 | A | * | 4/1960 | Johnson | 239/346 |
| 2,953,306 | A | * | 9/1960 | Dijkstra | 239/417.3 |
| 3,005,369 | A | * | 10/1961 | Koster | 285/132.1 |
| 3,342,193 | A | * | 9/1967 | Deering et al. | 137/3 |
| 3,825,286 | A | * | 7/1974 | Henry, III | 285/93 |
| 5,403,522 | A | * | 4/1995 | Von Berg | 261/36.1 |
| 5,664,733 | A | * | 9/1997 | Lott | 239/429 |

FOREIGN PATENT DOCUMENTS

| EP | 0 490 298 | 6/1992 |
| JP | 194423/1987 | 12/1987 |
| JP | 2-48022 | 12/1990 |
| JP | 7-31841 | 2/1995 |
| JP | 8-950 | 1/1996 |
| JP | 8-257347 | 10/1996 |

OTHER PUBLICATIONS

JPO English Machine Translation: JP 07–031841, 02–1995, Hiroo et al.*
JPO English Machine Translation: JP 08–000950, 01–1996, Tamaru et al.*

* cited by examiner

Primary Examiner—Hien Tran
Assistant Examiner—Jennifer Leung
(74) Attorney, Agent, or Firm—Crowell & Moring LLP

(57) ABSTRACT

The wet-gas desulfurizing apparatus according to this invention removes the oxides of sulfur, such as $SO_2$, from combustion exhaust gas by scrubbing the combustion exhaust with an absorption liquid which contains an alkali. It includes: 1) a branch pipe to circulate the absorption liquid which is inserted into a collection tank, of which the end discharges the absorption liquid into the collection tank, and the branch pipe having an internal diameter of D; and 2) an air-blowing pipe in inject air into the branch pipe, of which the end is inserted at an insertion point located between 3 D and 10 D from the discharge end of the branch pipe. The end of the air-blowing pipe is inserted into the branch pipe, and has an appearance of a semicircular trough facing downstream toward the collection tank.

2 Claims, 14 Drawing Sheets

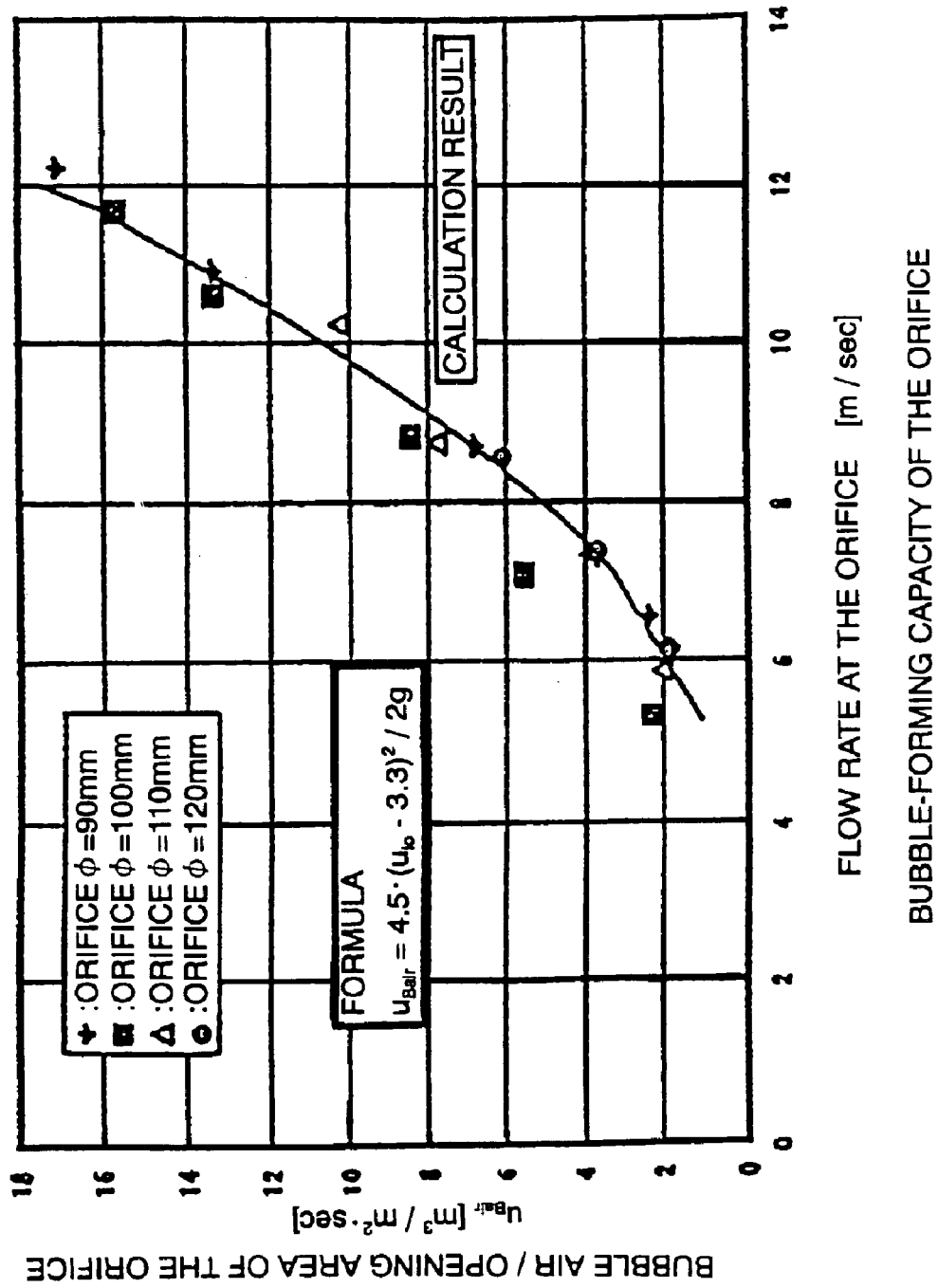

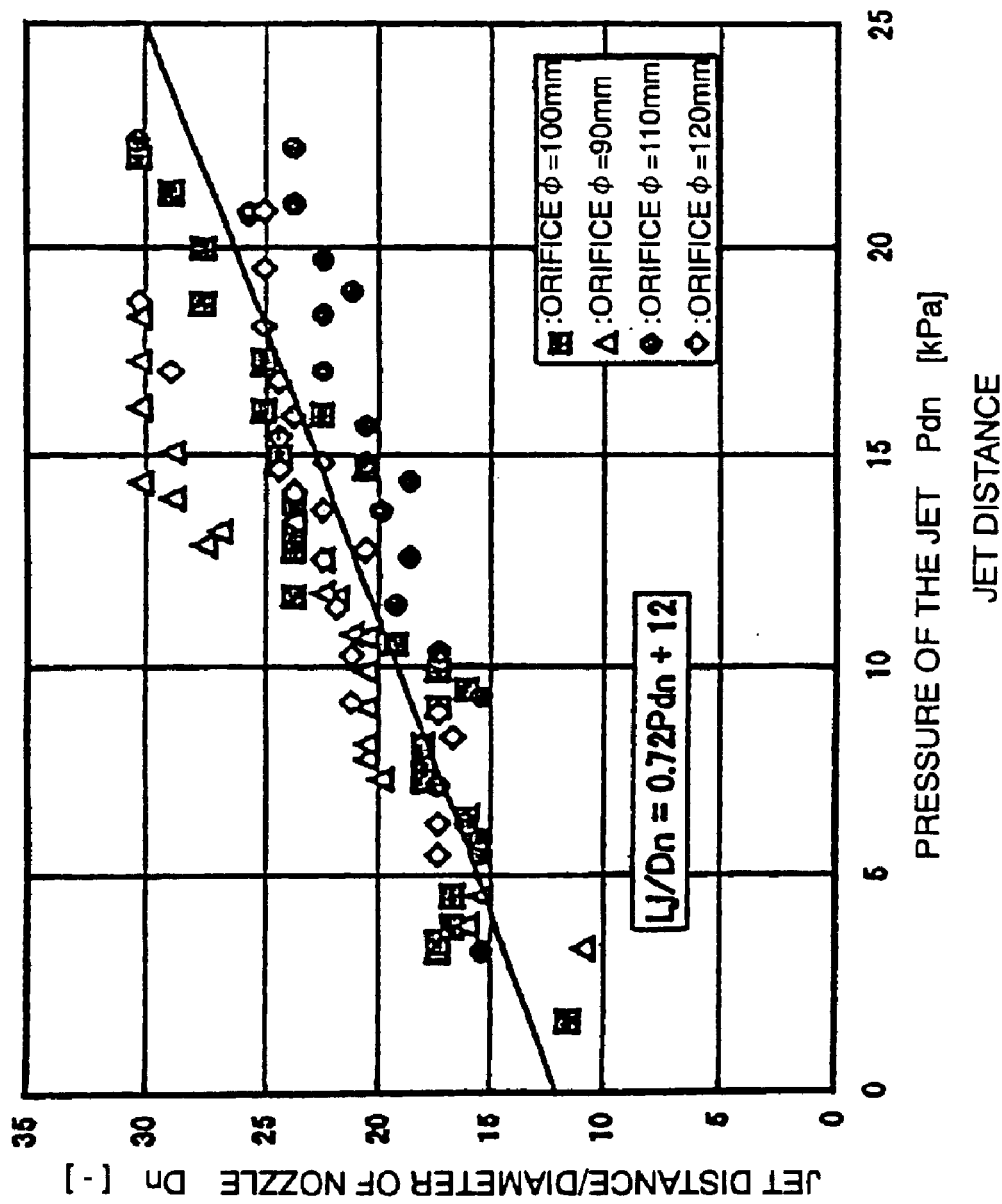

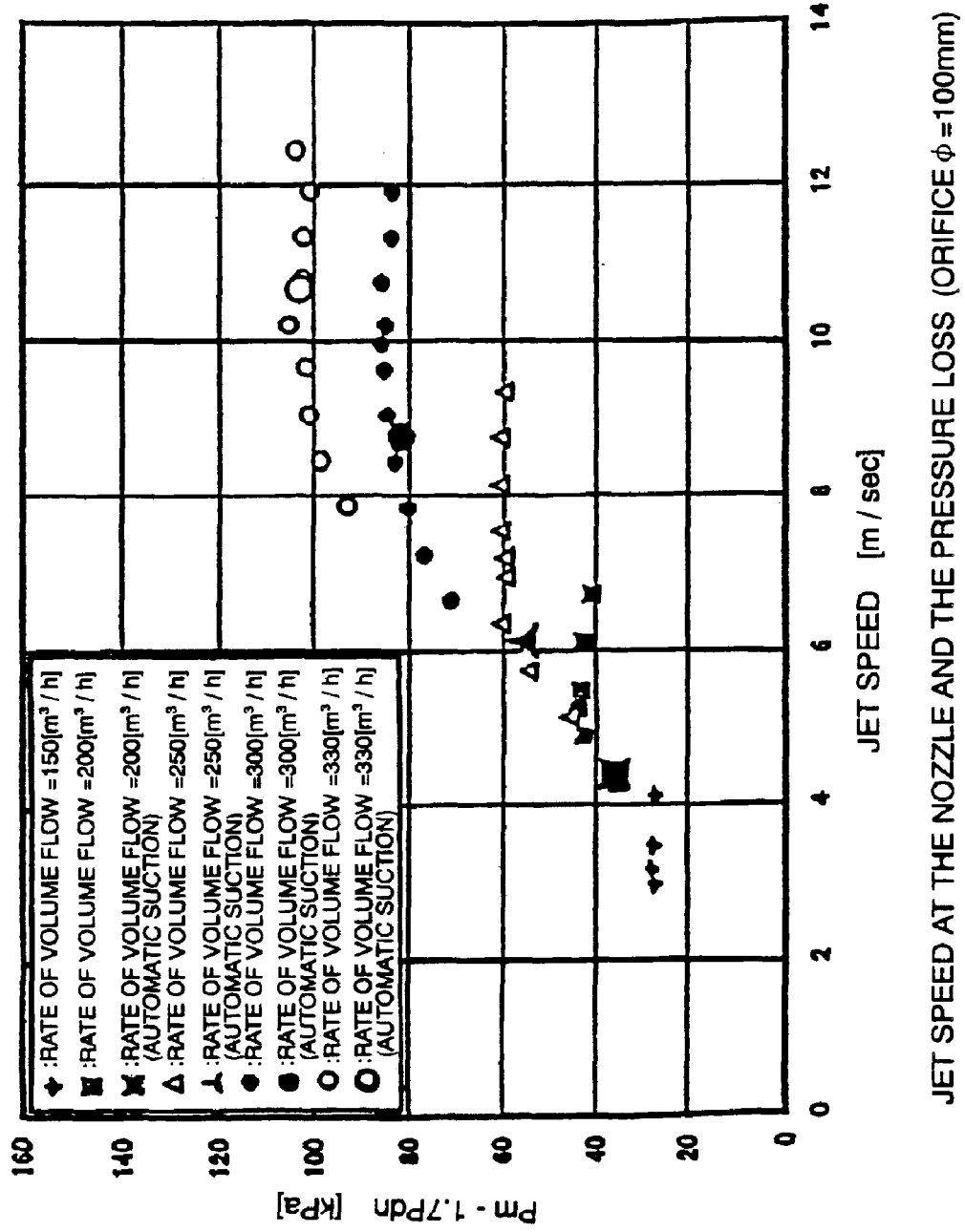

FIG. 13 (A) PRIOR ART
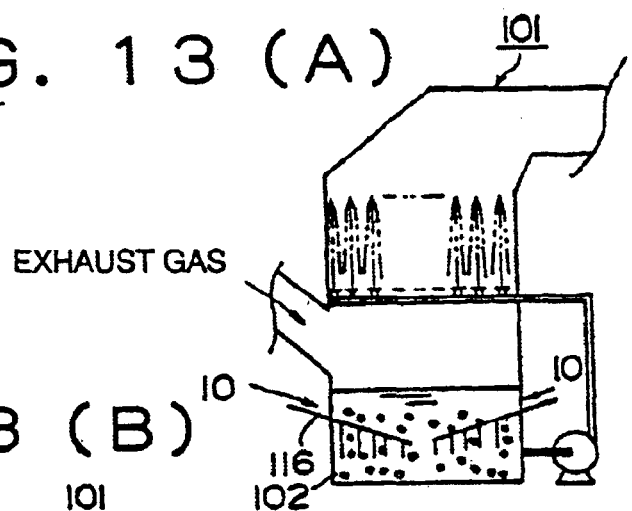
FIG. 13 (B) PRIOR ART
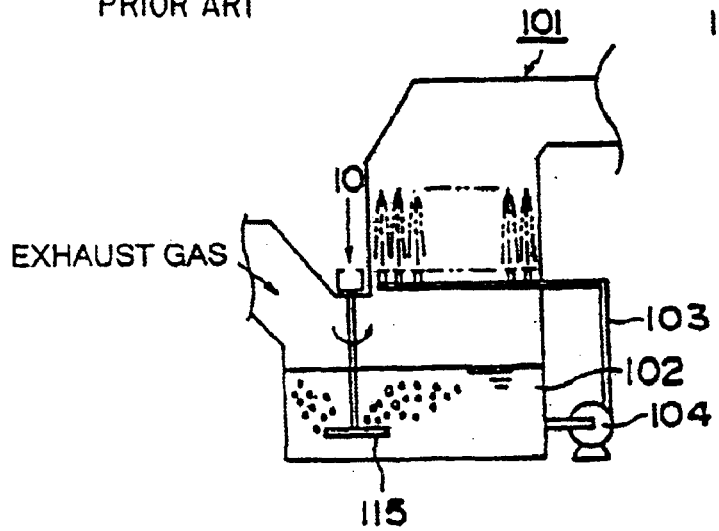
FIG. 13 (C) PRIOR ART
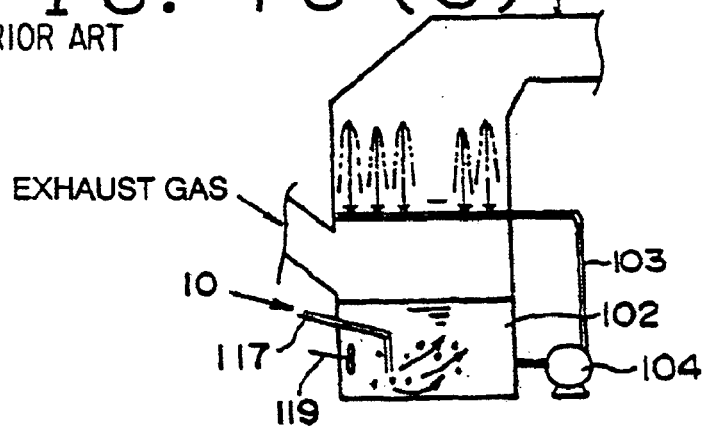

WET TYPE FLUE GAS DESULFURIZATION EQUIPMENT

TECHNICAL FIELD

This invention concerns an improvement in a wet gas desulfurizing apparatus to desulfurize exhaust smoke. The apparatus scrubs the $SO_2$ (sulfur dioxide) from exhaust gas generated by combustion in a boiler. It removes the $SO_2$ by forcing it through an absorption liquid containing an alkali.

TECHNICAL BACKGROUND

When a fuel containing sulfurous components is combusted, these components, with the exception of those that become fixed to the ash, are released into the atmosphere as sulfur dioxide ($SO_2$). This gas has a harmful effect not only on humans and animals, but also on the environment, since it falls to earth as acid rain.

In the past, concern over sulfur dioxide has led to large-scale combustion equipment and plants being fitted with devices to desulfurize their exhaust smoke. Most of these apparatuses employ the wet gas method.

To desulfurize exhaust gas using the wet gas method, the exhaust gas is brought into contact with an absorption liquid containing an alkali such as lime. The $SO_2$ is absorbed and removed. The sulfite generated in the absorption liquid when the $SO_2$ from the exhaust gas is absorbed is oxidized to produce a more stable sulfate. Normally, this is accomplished by injecting air into the absorption liquid.

Various devices have been developed in the prior art to inject air into the absorption liquid. For example, in FIG. 13(A), air (10) is injected into every part of collection tank 102 by a large number of pipes 116 (Technique A). In FIG. 13(B), air (10) is injected through a rotating arrangement of pipes 115, as they rotate, into every part of collection tank 102 (Technique B). In FIG. 13(C), air which is injected through a number of fixed pipes 117 is mixed and perturbed by agitator 119 (Technique C). In FIG. 14, auxiliary pipe 118, which circulates the absorption liquid in collection tank 102, has a separate circulation pump 118b. On pipe 118 is another pipe, 118a, to inject the air. In pipe 118, a mixture of air and liquid is formed, and this mixture is sprayed into the tank. Agitator 119 is also used to disperse the air (10) through all parts of collection tank 102 (Technique D).

Technique E is another way to inject air into the absorption liquid. Instead of the independent pipe 118 used to circulate the absorption liquid in Technique D described above, a pipe 110a (See FIG. 10) is used which branches off from pipe 103, the pipe which sprinkles the absorption liquid toward the exhaust gas. This method does not feature an agitator 119.

Of the various means described above to inject air into the liquid, Technique B in FIG. 13(B) needs neither an independent pipe to circulate the liquid nor an agitator, and its oxidation capacity is high. However, it would be difficult to install such a system in an absorption tower, which is currently the most commonly used type of scrubber. The system shown in FIG. 13(A), in which a large number of fixed pipes 116 are used, is the only one possible. The limitations of the oxygenating capacity of this method require a tank of considerable size.

There is a strong demand for a solution to this problem realized by equipment which can be installed on the sidewalls of the tank, which is not limited to a single location, and which has the same oxygenating capacity as Technique B described above. A number of plans have been advanced for such equipment.

The agitator 119 shown in Techniques (C) and (D) is needed to maintain an efficient oxygenating capacity and to prevent the accumulation of sediments produced by oxygenation. However, the equipment required for such an agitator is expensive and bulky.

An example of an oxygenating apparatus in current use may be found in the Japanese Utility Model Publication (Koukai) 62-194423.

The oxygenating apparatus disclosed in that publication is in a wet gas desulfurizing apparatus for scrubbing sulfur from exhaust smoke. In it, the gas inlet unit by which exhaust gas is introduced is connected to the absorption tower, and a pipe to sprinkle the absorption liquid is connected to a sprinkler which is mounted in the tower above the collection tank, which sits on the floor of the tower. A pipe to circulate the absorption liquid branches off from the aforesaid sprinkler pipe and is connected to the collection tank on the floor of the tower. An air-blowing means to blow air into the tower is installed in the branch pipe.

The oxygenating means (i.e., the air-blowing device) described in this publication is actually designed as follows. (See FIG. 10.)

As can be seen in FIG. 10, this concept corresponds to the oxygenating apparatus described as Technique E above.

The absorption liquid in collection tank 102 on the floor of tower 101 is conducted through the exhaust gas conduit (not shown) by way of circulation pump 104 and pipe 103. The sprinkled liquid absorbs and dissolves the $SO_2$ in the exhaust gas and is then returned to tank 102, where it accumulates.

In this method, the means of oxygenating the absorption liquid in tank 102 is the device to blow air described below.

Downstream from circulation pump 104 on pipe 103, the pipe which sprinkles the absorption liquid, is branch pipe 110a, which recirculates the liquid. One end of this pipe is connected to circulation pump 104; the other is connected to collection tank 102. Air pipe 105, which has a smaller diameter than the branch pipe 110a, is installed on that pipe. The end of the air pipe, 105a, is inserted into pipe 110a, and it is bent so that its axis is co-linear with the axis of pipe 110a. The airflow 10 which comes through the pipe travels in the same direction as the absorption liquid 11 flowing through pipe 110a, and it is discharged flowing downstream, having been turned by the end of the pipe. An air pump 106 is installed on the air pipe 105.

In addition to the oxygenating apparatus described above, various other designs have been suggested, including another means to blow air into the tower to promote oxidation of the absorption liquid, a means to use the airflow to break the liquid into small drops and a device which does not require the use of an agitator.

In the method described in Japanese Patent Publication (Koukai) 8-257347, which is illustrated in FIGS. 11(A) and (B), circulation pump 104 drives the absorption liquid out of the upper portion of collection tank 102, which sits on the floor of tower 101, through pipe 103. It is sprayed into the tower through nozzles (not shown). In the process of falling, the liquid comes in contact with the exhaust gas. The liquid, which now contains a high concentration of $SO_2$ is conducted directly into collection tank 102 via pipe 110b. The upward current generated in tank 102 by the downward thrust of the downward-flowing current distributes the liquid and prevents the sedimentation of particulates such as gypsum.

The air used for oxidation may be blown into liquid 11 as it is being conduct ed to the bottom of tank 102, or it may be introduced in pipe 110b and brought into contact with the liquid containing a high concentration of $SO_2$. This will speed up the oxidation reaction. The air can be distributed uniformly throughout tank 102 in the form of tiny bubbles which escape through pinholes 111a on the bottoms of a traylike array of pipes 111.

In the method just described, then, air is blown into the absorption liquid just after it has come in contact with the exhaust gas, when it contains a high concentration of $SO_2$. This is the means to promote oxygenation of the absorption liquid. The air which is introduced speeds up the oxidation reaction. The means used to introduce the air in small quantities in order to bring about effective liquid-vapor contact is to blow the air into the liquid which is flowing by the force of gravity through the pipe which carries it back to the tank. The liquid-vapor mixture is discharged via pipe array 111 at the end of pipe 11. Array 111 consists of concentric rings with numerous pinholes on their underside. These pipes are installed over the entire surface of the bottom of the tank so that the air can be distributed throughout the tank.

However, sedimentation causes scale to form on the blowholes 111a, posing a serious problem with respect to maintenance.

Another design, shown in FIG. 12, renders unnecessary the agitator which creates flow in the liquid stored in the tank described above and so distributes the air to prevent the blowholes from becoming encrusted or sedimented with products such as gypsum. A number of jet nozzles 112 are oriented at a given angle with respect to the normal line of branch (recirculation) tank 102. The liquid in tank 102 is sprayed along the wall of the tank so that it is conveyed in the directions indicated by arrows A. Independent pipes 110c run between the bases of the jet nozzles 112 and tank 102. Air pipes 114 go into the nozzles forward of their bases. This configuration requires a great deal of space in which to mount the nozzles around the absorption tower which contains tank 102, and there is no way to downsize it. In addition, certain aspects of bubble formation and the diffusion of the bubbles into the liquid could stand improvement.

The apparatus shown in FIG. 10, in which air is injected into pipe 110a before the liquid is returned to the tank and distributed as tiny bubbles, has the following shortcomings.

First, because the air (10) is injected into the branch pipe under high pressure, a cavity of negative pressure is likely to form in the pipe. The pressure of the liquid will fluctuate and remain unstable, and the inner surfaces of the pipe are likely to erode. Second, the air bubbles which are dispersed through the pipe after the liquid and vapor have combined have to flow a considerable distance before they are uniformly distributed. Thus the pipe going from the point where the liquid and vapor meet to the collection tank must be fairly long. It would be very beneficial to reduce both the size of the equipment and its cost by solving this problem.

DESCRIPTION OF THE INVENTION

This invention was conceived to address the shortcomings discussed above. It reduces both the cost and the size of the equipment required while maintaining an efficient oxidation capacity. It comprises a means of mixing liquid and vapor which takes advantage of the cavity in the current and so dispenses with a blower, and a means of creating a spray of the liquid-vapor mixture which dispenses with an agitator. Its objective is to provide a device to inject air in a wet gas desulfurizing apparatus to desulfurize exhaust smoke which will require less space, consist of smaller equipment, be cheaper, be less expensive and easier to maintain, and require less effort to operate.

To achieve the objectives outlined above, the invention was designed as follows. It comprises a wet gas desulfurizing apparatus to remove sulfur from smoke. This apparatus removes the oxides of sulfur ($SO_2$ and $SO_3$) from combustion exhaust gas by scrubbing it with an absorption liquid which contains an alkali. It is distinguished by the fact that it has a pipe which injects air into the pipe which circulates the absorption liquid, one end of which opens into the collection tank in the absorption tower. If we call the internal diameter of the branch pipe D, then the air pipe should intersect the branch pipe at a point which measures between 3 D and 10 D from the end of the pipe.

This pipe configuration is such that the branch pipe is connected downstream of the circulation pump on the main pipe which connects the collection tank and the means to spray the liquid. This obviates the need for a separate circulation pump on the branch pipe.

In this configuration, then, if the pipe which circulates the absorption liquid has a diameter D, the air pipe is connected to it at a point which is between 3 D and 10 D from the end of the branch pipe. As a result, the cavity of negative pressure in the branch pipe which is caused by the injection of the air is stabilized by the time the flow reaches the end of the pipe. The injected air goes into the collection tank in the form of tiny, uniformly dispersed bubbles which efficiently oxidize the absorption liquid.

If the air pipe is connected more than 10 D from the end of the branch pipe, the bubbles resulting from the liquid-vapor interface will disappear, and the effect of the invention will not be fully attained.

It would also be possible for this invention to be realized by cutting off the bottom portion of the air pipe inserted into the branch pipe so as to aim the airflow downstream.

With the invention described above, the air which is injected into the branch pipe causes a cavity to form in the flow. In the region of this cavity, the air and water meet and form a liquid-vapor mixture.

In other words, when the air pipe is mounted on the branch pipe the bottom half of its end is cut off. The open portion faces downstream, which causes a flow in opposition to that coming down the branch pipe in the form of a stream behind the cut-off pipe. The air flows into the large cavity created in this streamlike area, quickly stabilizing the cavity formed in the pipe by the injection of the air and eliminating it. This design minimizes pressure fluctuations in the liquid and curtails erosion in the pipe.

As can be seen in FIG. 4, the cavity point of the boundary layer for the cut-off portion 4a of the air pipe is fixed. Therefore, the pressures of both liquid and air are stabilized. And the fact that the open portion 4a of the pipe is large will mean that the air pressure exiting the pipe is reduced.

Thus cavity 41a is stabilized, and the air is formed into tiny bubbles and distributed through the liquid along the edges of the cavity.

With the invention described above, the air flowing with the liquid in the pipe is at a low pressure. It combines with the liquid and is formed into small bubbles at the boundaries of cavity 41a and dispersed into the surrounding liquid. This allows the air to be supplied at a lower pressure, which reduces the operating cost.

The air bubbles in the pipe after the air and liquid have been combined need flow only a short distance before they are uniformly distributed. This allows a shorter pipe to be used between the point of admixture and the collection tank, thus reducing both the size of the equipment and its cost.

An alternative design of this invention would be to provide an orifice upstream from the point where the air pipe comes into the branch pipe. The air pipe would then discharge the air in the region of negative pressure created by the orifice. With this invention, an orifice constricts the flow in the branch pipe. Air is sucked into the region of negative pressure (i.e., the cavity) created by the cavity resulting from the orifice. The eddy generated in the cavity causes the air and liquid to combine. The positive pressure which occurs when the flow expands downstream of the constriction causes tiny bubbles to form and distributes them throughout the air-water mixture, which enters the collection tank in the form of a jet.

To assure that the effect is achieved smoothly, the diameter of the orifice should be ⅔ to ¾ that of the branch pipe so that the flow rate of the absorption liquid through the orifice is 8 to 14 m/sec.

With this invention, the liquid-vapor mixture which is sprayed into the collection tank keeps the liquid in the tank in a constant state of agitation, thus obviating the need for an agitator.

This invention, then, dispenses with the need for a blower to supply air, since the negative pressure in the cavity causes air to be sucked in automatically. In the process of increased pressurization which occurs after the flow is compressed, the flow of liquid-vapor mixture is caused to form tiny bubbles which are dispersed throughout the mixture so that by the time it exits the pipe and enters the collection tank, it has assumed the form of a jet. This jet agitates the liquid in the tank, providing a high level of oxidation without resorting to any agitating device.

The orifice in the invention described above can be realized simply by installing an orifice panel in the pipe, so the equipment cost remains low. And because air is sucked into the branch pipe automatically, as described above, no blower is needed, resulting in a more compact apparatus. Highly efficient oxidation of the absorption liquid can be achieved after the pipe has branched from the circulation pump. There is no need to use an independent branch pipe on which an air pipe and a low-pressure pump are installed.

Having a device to mix the liquid and vapor which can produce tiny bubbles reduces the long-term erosion of the inner surface of the pipe where the mixture occurs, reduces the space required, allows the apparatus to be more compact, reduces its cost, makes maintenance easier and cheaper and makes the apparatus easier to operate.

BRIEF DESCRIPTION OF THE DRAWINGS

FIG. 9 (A) is a graph showing the relationship between the pressure of the jet at the nozzle (of the branch pipe) and the ratio between the distance to the nozzle and the nozzle diameter. (B) is a graph of the relationship between the rate of flow and the pressure of the jet when the air is injected by a blower and that when the air is sucked in by a 100 mm orifice.

FIG. 13 shows the various types of air-blowing devices in prior art wet gas desulfurizing apparatuses to desulfurize exhaust smoke. (A) has numerous fixed blow pipes. (B) has multiple revolving blow pipes. (C) has multiple blow pipes with agitators.

Figure 1:
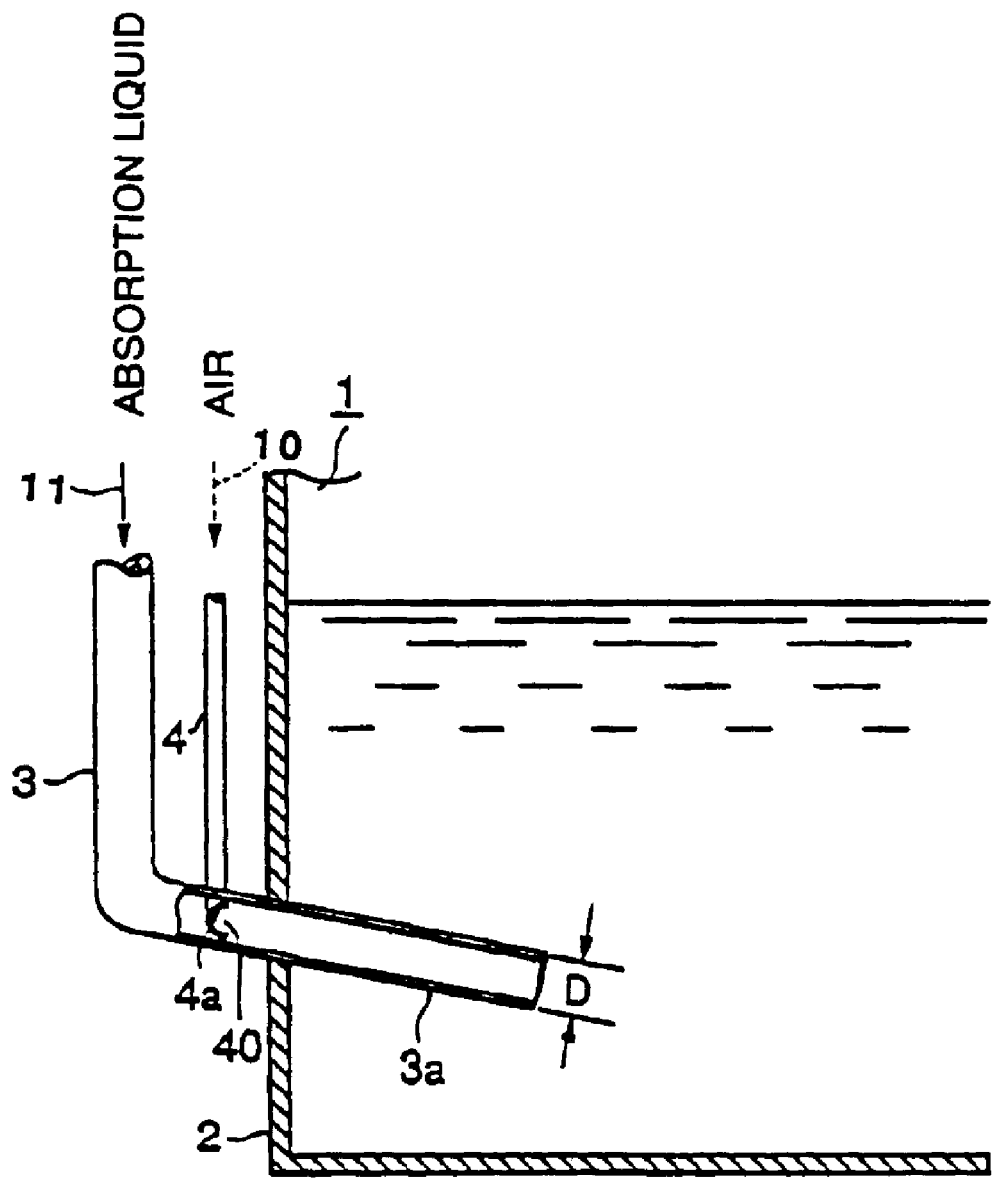
FIG. 1 is a partial vertical cross section of the air-blowing device in a wet gas desulfurizing apparatus to desulfurize exhaust smoke which is a first preferred embodiment of this invention.

Identifying numbers in the drawings are as follows. 1 is the absorption tower. 2 is the collection tank. 3 is the branch pipe which circulates the absorption liquid. 4 is the air-blowing pipe. 4a is the end of the air pipe. 5 is the orifice. 6 is the region of negative pressure. 10 is the air. 11 is the circulating absorption liquid. 12 is the liquid-vapor mixture.
Preferred Embodiments A detailed explanation of the invention will now be given using the embodiments pictured in the drawings. Whenever the shapes, relative positions and other aspects of the parts described in the embodiments are not clearly defined, the scope of the invention is not limited only to the parts shown, which are meant merely for the purpose of illustration.

Figure 2:
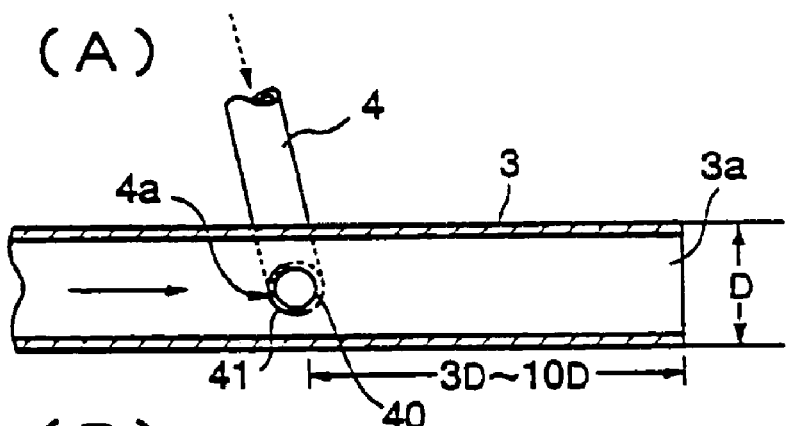
FIG. 2 is an enlargement which shows the relationship of the branch pipe which circulates the absorption liquid and the air pipe in FIG. 1; (A) is a vertical cross section; (B) is a frontal view.
Figure 2:
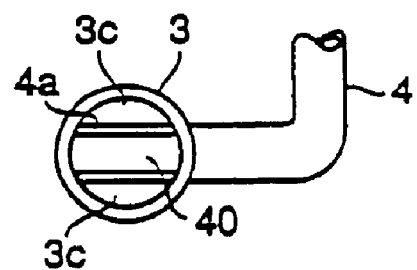
Figure 3:
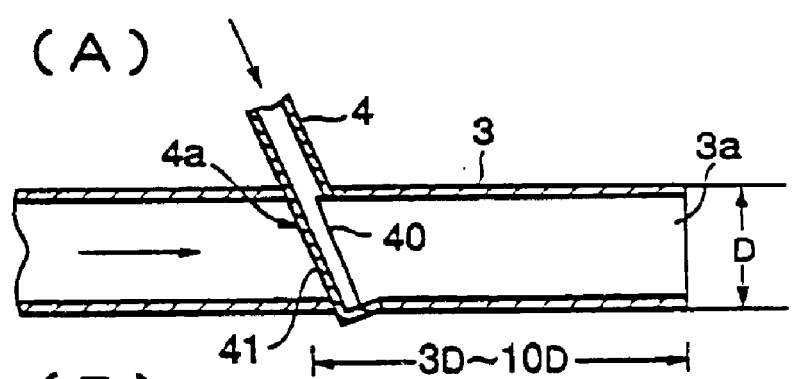
FIG. 3 shows the relationship of the branch pipe which circulates the absorption liquid and the air pipe in a second preferred embodiment of this invention; (A) is a vertical cross section; (B) is a frontal view.
Figure 3:
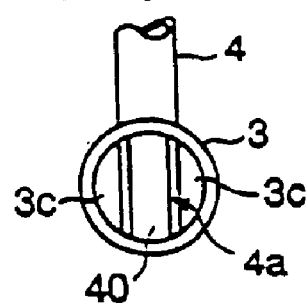
Figure 15:
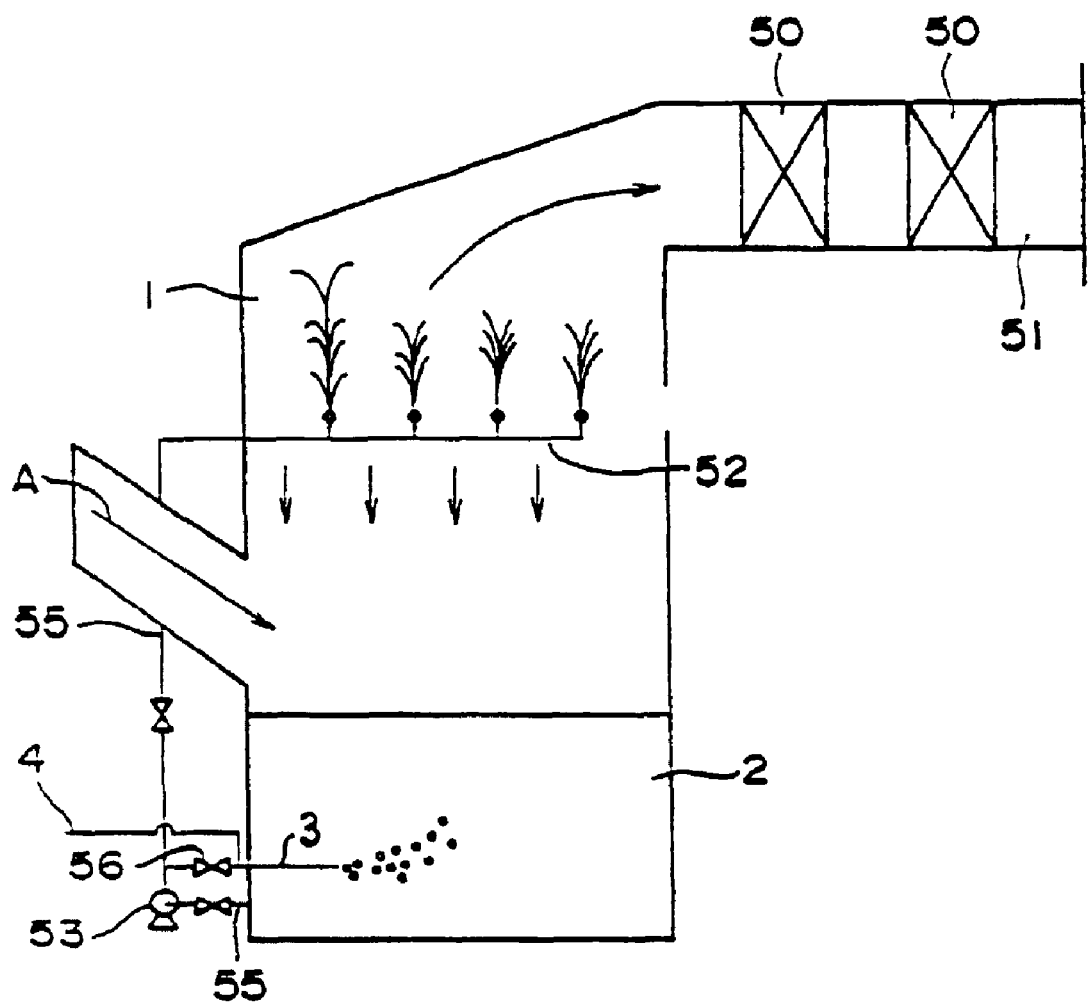
FIG. 15 shows the overall configuration of a wet gas desulfurizing apparatus to desulfurize exhaust smoke in which the present invention has been implemented.

FIGS. 1 and 2 show a first preferred embodiment; FIG. 3 shows a second and FIG. 5 a third. FIG. 15 shows the overall configuration of a wet gas desulfurizing apparatus to desulfurize exhaust smoke in which the present invention is implemented.

In FIGS. 1, 2 and 15, 2 is the collection tank on the bottom of absorption tower 1 in the wet gas desulfurizing apparatus to desulfurize exhaust smoke. The tank 2 collects the absorption liquid, an emulsion containing an alkali component such as lime. As is well known, distribution means 52, which is a sprayer or the like, sprays the absorption liquid supplied from collection tank 2 into combustion exhaust gas A, which is conducted from a combustion device such as a boiler. Sulfur oxide gases such as $SO_2$ are taken up by the absorption liquid. The liquid containing the captured $SO_2$ drips or runs down inside the tower and returns to collection tank 2. Once the sulfur oxide gases such as $SO_2$ have been removed, mist eliminators 50 remove the mist from the exhaust gas. The exhaust is then released through smoke exhaust unit 51 to the smoke processing unit which is the next stage or to the atmosphere.

Since the absorption liquid in collection tank 2 contains sulfites, they must be oxidized and removed in the more stable form of sulfates. This is why a wet-gas coal smoke scrubber needs an air-blowing device which can supply sufficient air 10 to collection tank 2.

The air-blowing device of this embodiment can be seen in FIG. 15. There is a pump 53 on the upstream side of distribution pipe 55, which distributes the absorption liquid. Branch pipe 3, which branches from pipe 55 and is mediated by a valve 56, is extended into collection tank 2. End 3a of pipe 3 discharges the liquid into collection tank 2.

Figure 4:
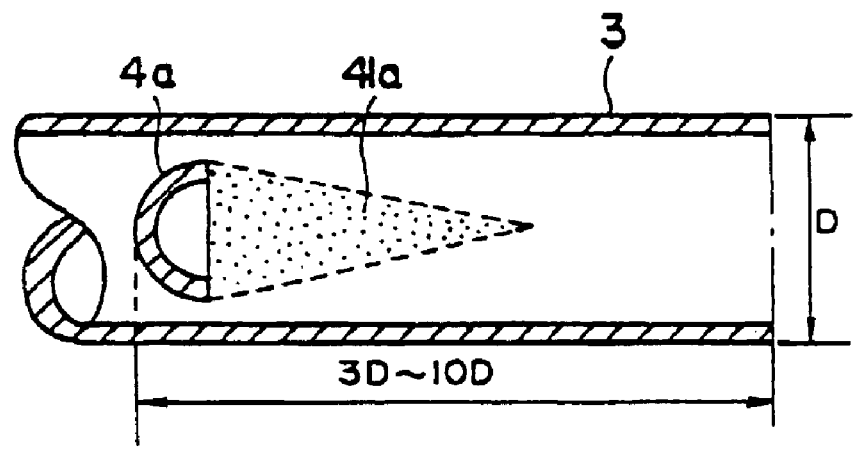
FIG. 4 is an enlargement to illustrate the relationship between the branch pipe which circulates the absorption liquid and the air pipe in FIG. 2.

The end 4a of air pipe 4 is inserted into branch pipe 3 near the wall of collection tank 2. As can be seen in FIG. 4, the lower half of end 4a, the end which is inserted into branch pipe 3, is cut off to form a cavity 41a, which faces downstream. To put it another way, a vertical cross section of end 4a has the appearance of a semicircular trough facing downstream. Cavity 41a extends downstream from this trough. The free end of cut-off portion 4a is inserted all the way into branch pipe 3 until it reaches the further side of branch pipe 3.

In the example shown in FIG. 1, air pipe 4 runs into branch pipe 3 at a point outside collection tank 2; the air pipe could, of course, extend into the branch pipe at a point inside the collection tank as well.

If the interior diameter of branch pipe 3 is D, then, as is evident in FIGS. 2 and 3, the point at which air pipe 4 should be mounted, which will be the point of confluence of the end 4a with respect to branch pipe 3, should be a distance of 3 D to 10 D upstream from the end of branch pipe 3. Then even if the pressure of the air which is confluent with the liquid in branch pipe 3 is low, the air will form tiny bubbles and disperse immediately after the two streams become confluent. This design will enhance the effect of the liquid-vapor contact.

The interior diameter of cut-off end 4a is of course smaller than the exterior diameter D of branch pipe 3. Ideally, it should be between 0.4 D and 0.7 D so that the absorption liquid can flow easily through the constricted areas 3c above and below or to the left and right of the air pipe, which can be seen in FIGS. 2(B) and 3 (B).

As can be seen in FIG. 2(B), end 4a may be positioned so that when it is cut through its axis and the cut surface is viewed from the front with respect to branch pipe 3, it coincides with a horizontal cross section which goes beyond the center line of branch pipe 3. As can be seen in FIG. 3(B), it may also be positioned so that it coincides with a vertical (i.e. perpendicular) cross section which goes beyond the center line of branch pipe 3. It may also go beyond the center line and coincide with another oblique surface. The angle formed by the axes of end 4a and branch pipe 3 may be almost a right angle, as shown in FIG. 2(A), or it may be some other angle, as shown in FIG. 3(A) according to the second preferred embodiment of this invention.

In this embodiment, then, the end 4a of air pipe 4 is half cut away. Its rear portion 41, which faces the current in branch pipe 3, is streamlined. Its surface or cavity 41a, which is shown in FIG. 4 and faces downstream, is cut away to form a large opening across the entire width of the pipe. Thus the air in branch pipe 3 stabilizes the cavity and minimizes pressure fluctuations in the liquid. Erosion of the pipe is suppressed.

In the embodiments shown in FIGS. 2 and 3, even when the air which becomes confluent with the liquid in branch pipe 3 is at a low pressure, it will form tiny bubbles and disperse immediately after confluence. This allows air to be supplied at a lower pressure, which in turn reduces the operating cost.

Cut-away portion 40 is of sufficient size and its air pressure is sufficiently low that only a short length of branch pipe 3 is required for the bubbles to be uniformly distributed after the confluence of the liquid and vapor. This length, the length between the end 4a of the air pipe and collection tank 2, need be only 3 D to 10 D. This economy reduces both the size of the equipment and its cost. It would, of course, also be possible for the branch pipe 3 to be independent rather than branching from the distribution pipe. Branch pipe 3 would then have its own circulation pump.

Figure 5:
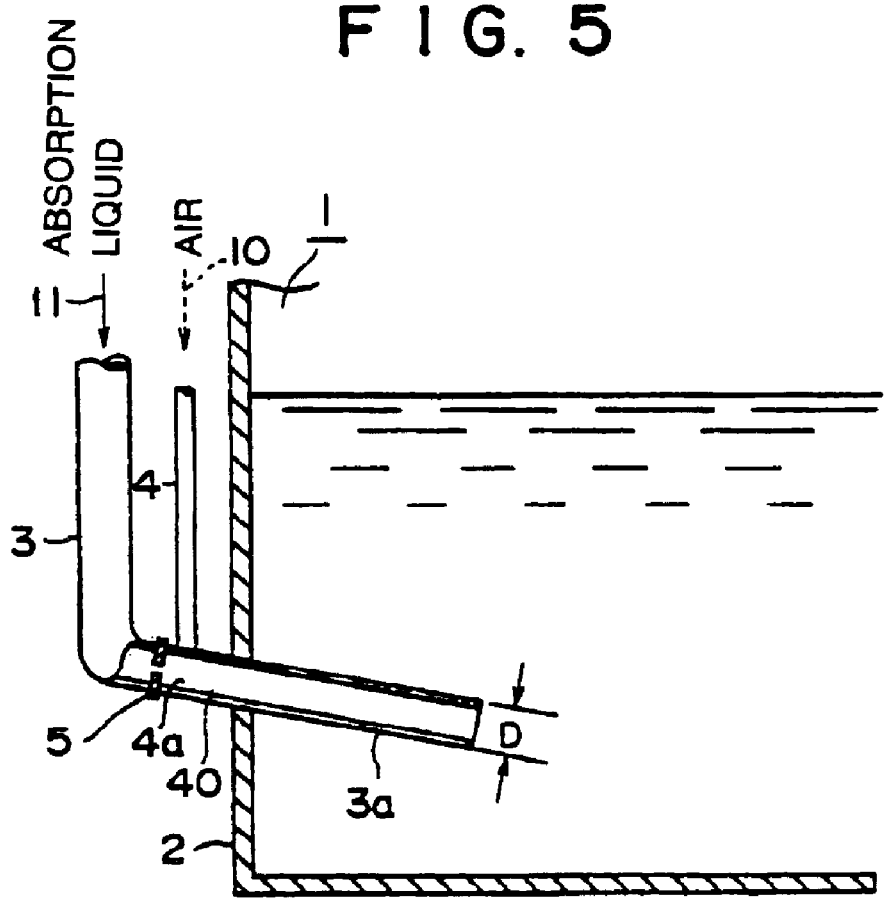
FIG. 5 is a partial vertical cross section of the air-blowing device in a wet gas desulfurizing apparatus to desulfurize exhaust smoke which is a third preferred embodiment of this invention.
Figure 6:
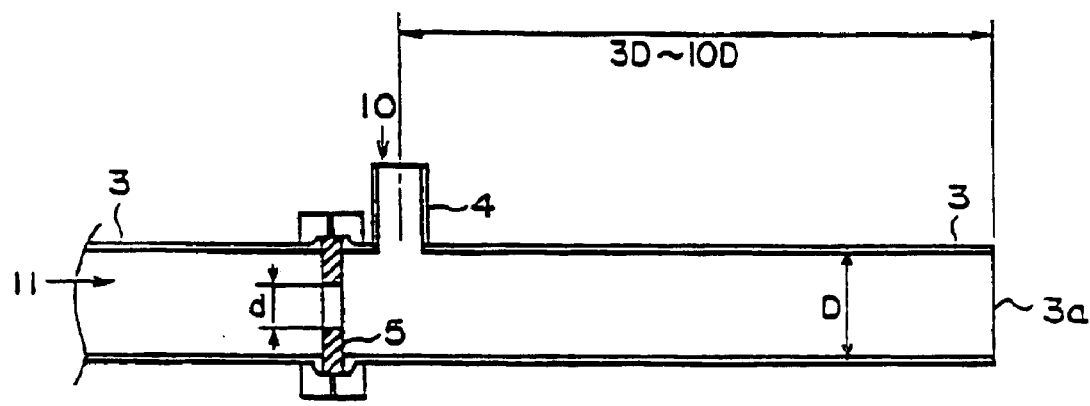
FIG. 6 shows the essential parts of an ejector nozzle comprising the branch pipe and the air pipe.
Figure 7:
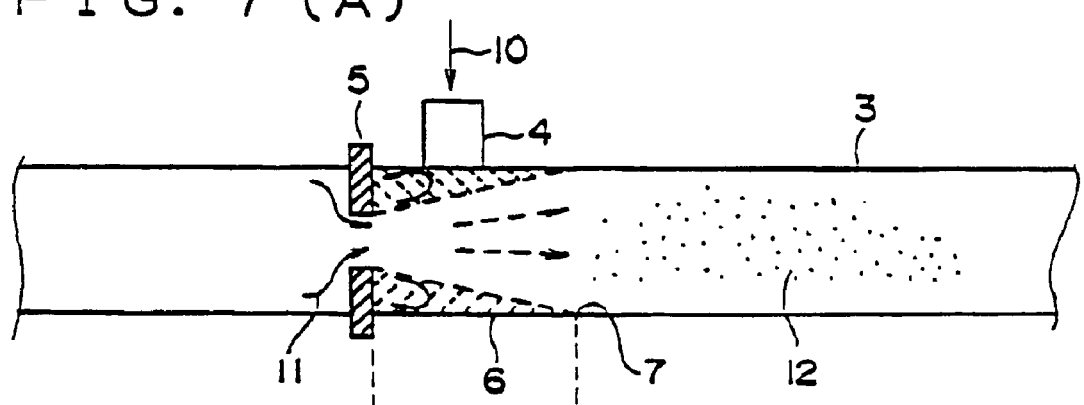
FIG. 7(A) illustrates the negative pressure region generated by the ejector nozzle in FIG. 6 and the cavity eddies generated in this region. (B) shows how the pressure changes in the negative pressure region caused by the ejector nozzle.
Figure 7:
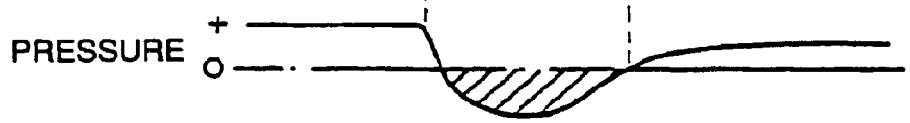

FIGS. 5 and 6 illustrate the configuration of the third preferred embodiment of this invention. FIG. 7(A) illustrates what goes on in branch pipe 3 just before liquid-vapor mixture 12 is formed from the air admitted via air pipe 4 and absorption liquid 11, which is passing from the constricted state it experienced in negative pressure region 6, the region created by orifice 5 having a diameter d, to an expanded state. FIG. 7(B) illustrates how the pressure changes in negative pressure region 6.

In this embodiment, which can be seen in FIGS. 5 and 6, the air-blowing device supplies a sufficient quantity of air 10 to collection tank 2, the tank which collects an absorption liquid containing an alkali component such as lime. The air-blowing device of this embodiment comprises an ejector nozzle in branch pipe 3 formed by an orifice.

Branch pipe 3 branches downstream from circulation pump 53, which is in distribution pipe 55, as is shown in FIG. 15. Branch pipe 3 is extended into collection tank 2. The absorption liquid is discharged and circulated into the tank from the end 3a of branch pipe 3. The orifice 5 is created in a straight portion of branch pipe 3 upstream from end 3a. Air pipe 4 opens into the negative pressure region 6 created by the orifice 5.

The air pipe 4 should be installed (i.e., it should introduce air) at a point which is between 3 D and 10 D upstream from the end 3a of branch pipe 3. The air to be used for oxidation is automatically sucked from air pipe 4 using the suction generated in negative pressure region 6. The cavity eddies generated in region 6 pick up the air so that by the time liquid 11 has passed from its constricted to its expanded state, the air is confluent with it, thus forming a confluent liquid-vapor mixture 12.

As can be seen in FIGS. 7(A) and 7(B), the absorption liquid 11 which passes through the orifice 5 begins to expand after generating negative pressure region 6. The instantaneous pressure reaches point 7 and reverts to its original pulse state. During this period, the air 10 which is sucked in forms a liquid-vapor mixture 12, in which the air converts to tiny bubbles as it shears. This mixture is discharged into collection tank 2 through the end 3a of branch pipe 3 in the form of a jet. Once the jet has conveyed the mixture to a given location in collection tank 2, a rising current is generated. This keeps the collected liquid in a constant state of agitation, providing excellent oxidation and preventing any sediments created by oxidation from accumulating.

Figure 8:
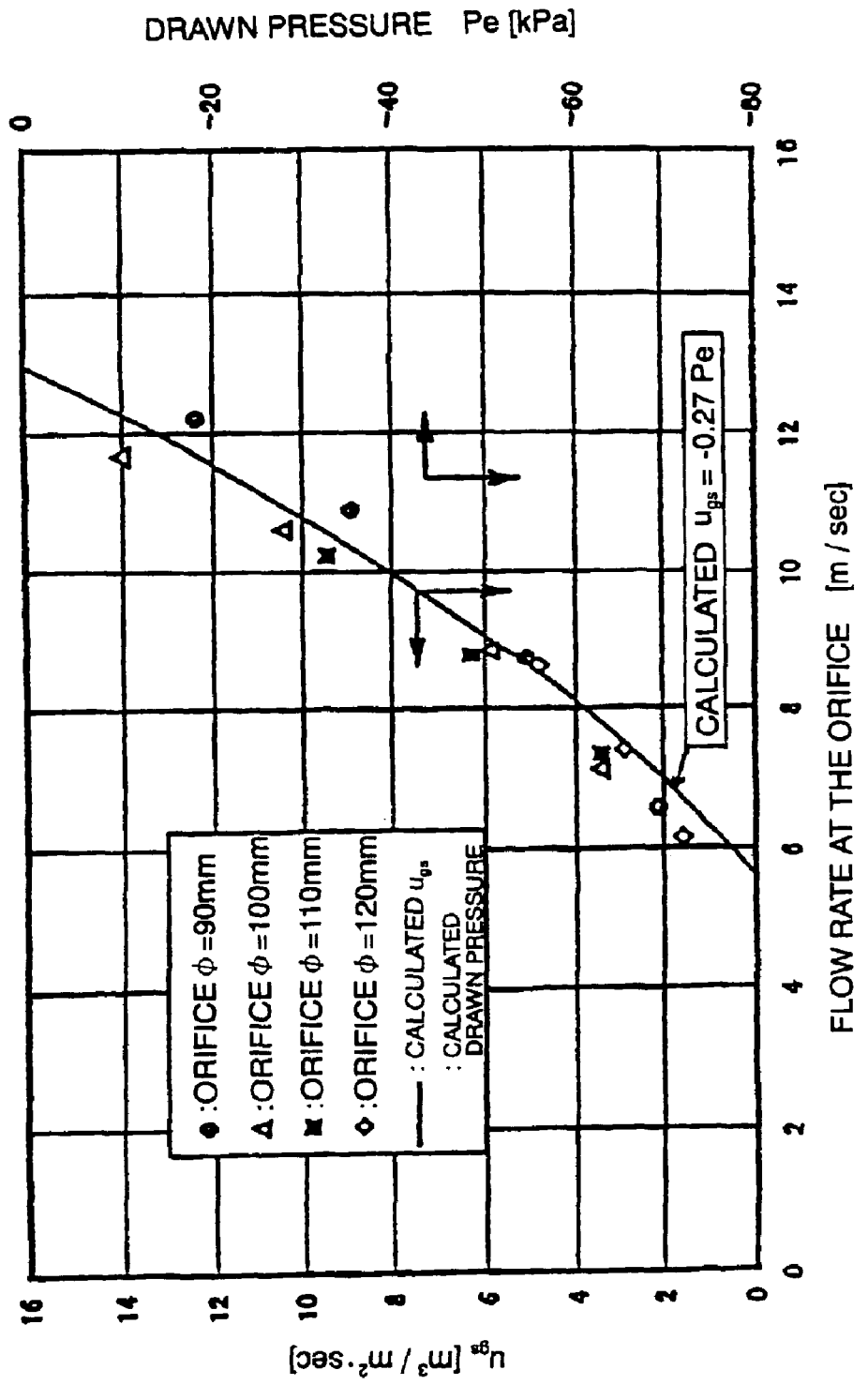
FIG. 8(A) is a graph showing the relationship between the quantity of air introduced and the size of the orifice, expressed as the value of the quantity of air divided by the area of the orifice, and the rate of flow of the jet at the orifice. (B) shows the relationship between the rate of flow from the orifice and the bubble-forming capacity. In the graph, the relationship is expressed using the value obtained by dividing the rate of flow of the air bubbles by the cross sectional area of the orifice.
Figure 10:
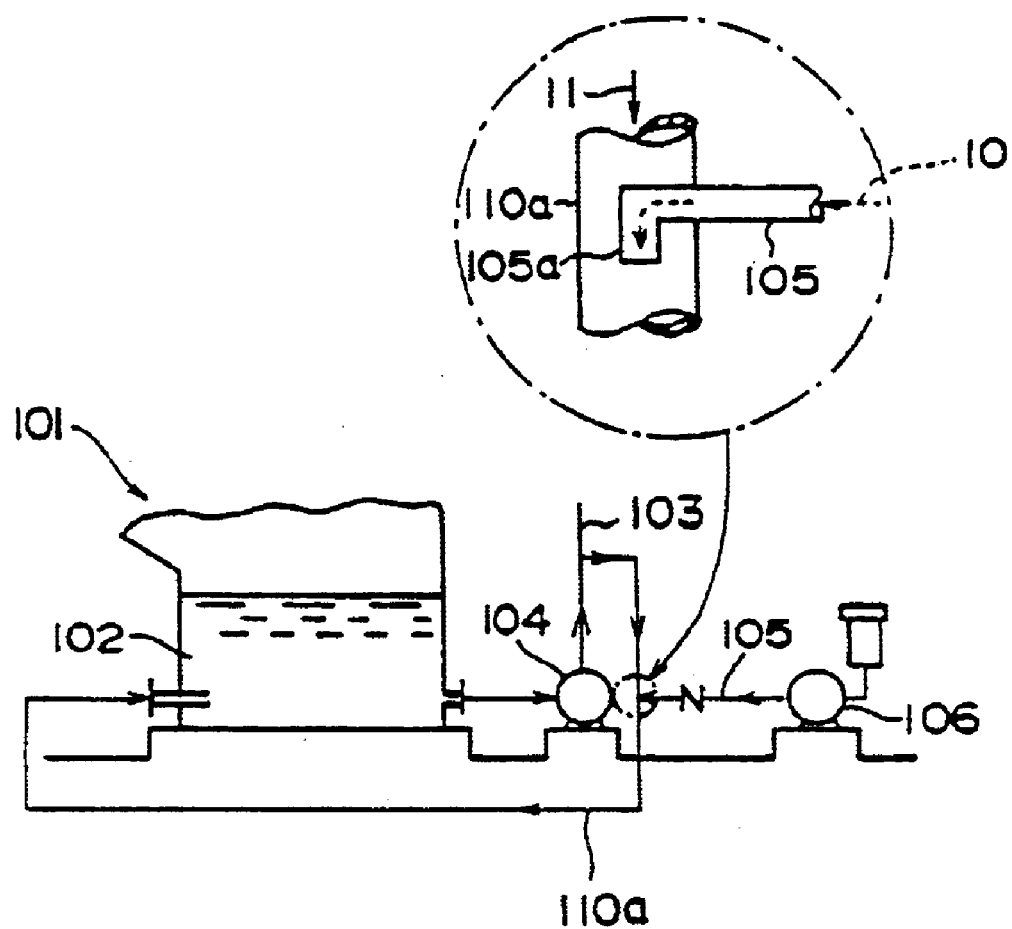
FIG. 10 shows the essential parts of a sample device for injecting air in a prior art wet gas desulfurizing apparatus to desulfurize exhaust smoke.
Figure 11:
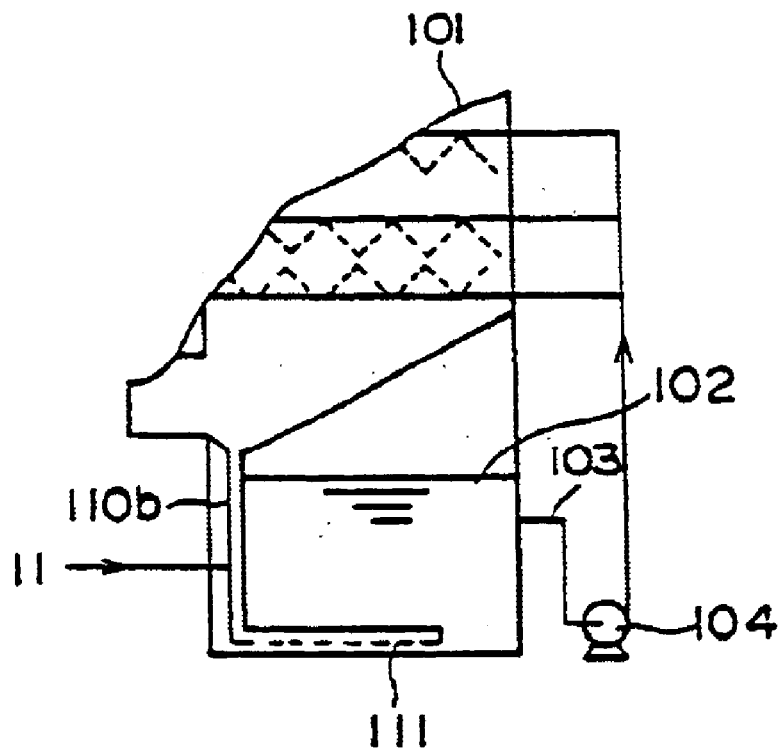
FIG. 11 shows the essential parts of another example of a device for injecting air in a prior art wet-gas device to desulfurize exhaust smoke.
Figure 11:
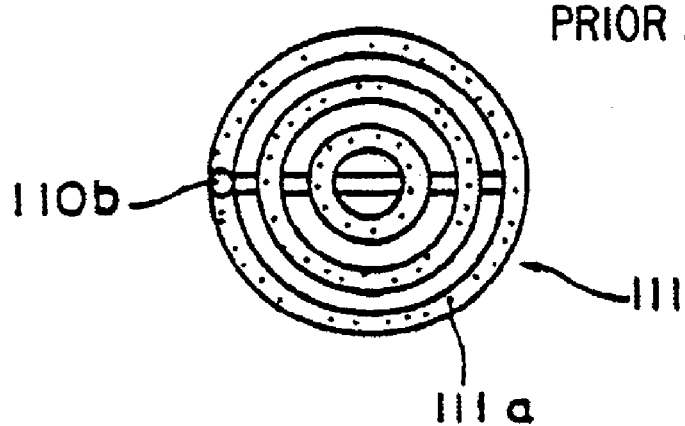
Figure 12:
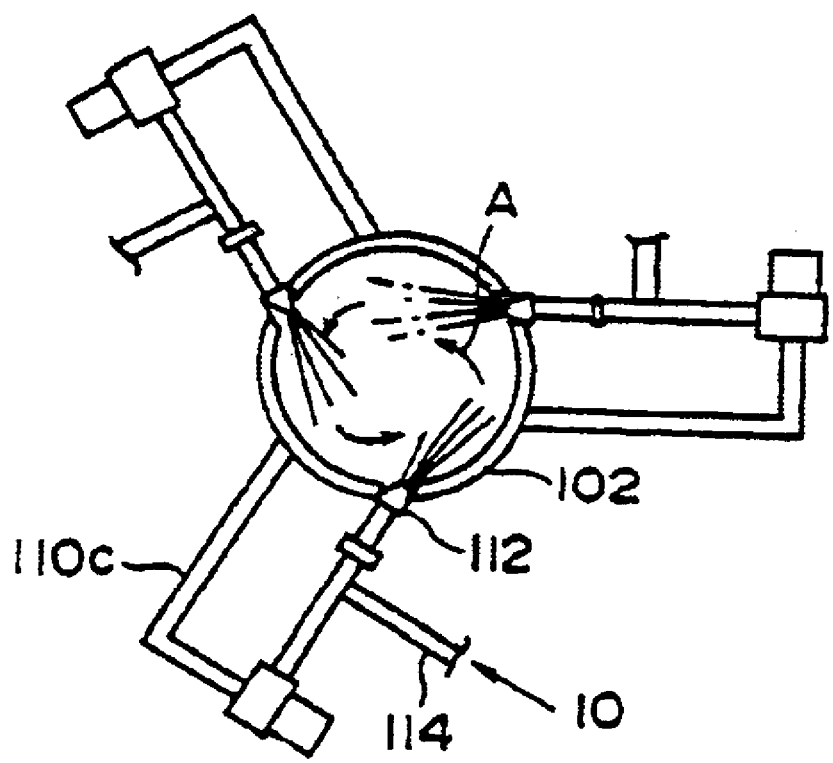
FIG. 12 shows the essential parts of still another example of a device for injecting air in a prior art wet-gas device to desulfurize exhaust smoke.
Figure 14:
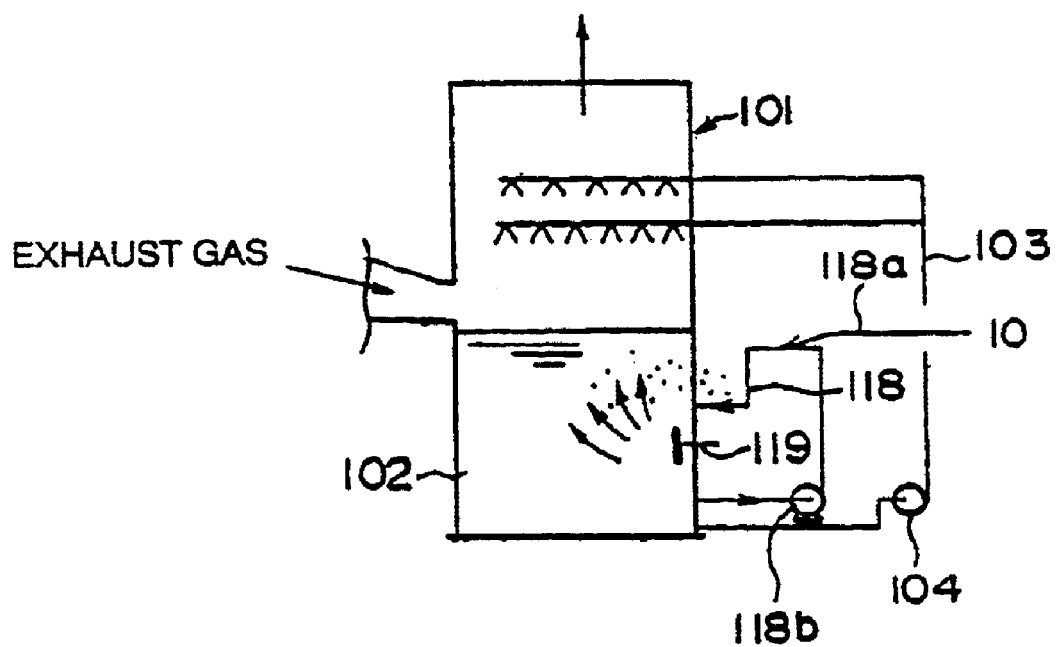
FIG. 14 shows another type of air-blowing device for a prior-art wet-gas sulfur scrubber different from the ones shown in FIG. 13. This device has an air pipe installed in an independent branch pipe, and it has an agitator as well.

The characteristics of the ejector nozzle associated with the air-blowing device of this embodiment were tested experimentally under the following operating conditions: the diameter of the mouth of the branch pipe was 150 mm φ; the rate of circulation was 100 to 350 m³/h; and the flow rate of the air was 60 to 600 m³/h. The results are given in FIGS. 8 and 9.

Air is sucked in automatically using the suction created by the orifice. The relationship between the flow rate of the liquid and the quantity of air sucked in was investigated separately from the diameter of the orifice. The same quantity of sprayed liquid passing through a small orifice which generates a large negative pressure will, of course, cause a larger volume of air to be sucked in. In FIG. 8(A), the volume of air drawn in is expressed in relation to the diameter of the orifice. The ultimate value expressed in the graph is the relationship between the value of the volume of air divided by the area of the orifice and the rate of flow through the orifice.

From this graph, it can be concluded that the ideal rate of flow would be between 8 and 14 m/s, and the ideal diameter of the orifice would be ⅔ to ¾ that of the branch pipe.

The relationship between the orifice and the rate of flow of the air being sucked in was then investigated.

The air which is sucked in is sheared off and formed into tiny bubbles depending on the flow rate of the liquid. However, the relationship between the bubble-forming capacity (the limit of the flow rate of the air) and the flow rate of the liquid is such that the same quantity of sprayed liquid will tend to increase the quantity of air successfully introduced in the form of bubbles as the orifice is made smaller.

FIG. 8(B) shows the relationship between the flow rate of the liquid exiting the orifice and the bubble-forming capacity. The relationship is expressed using the value obtained by dividing the flow rate of the tiny bubbles by the area of the orifice.

The formula represented by the solid line in FIG. 8(B) expresses the following relationship.

$$u_{bair} = 4.5(u_{10} - 3.3)^2 / 2g \qquad (1)$$

here $u_{bair}$ is the flow rate of the air in the form of bubbles divided by the area of the orifice [m³/m²·sec], and $u_{10}$ is the flow rate of the liquid exiting the orifice [m/sec].

From Formula (1), we see that a flow rate out of the orifice of at least 3.3 m/sec is needed to effectively convert the air to small bubbles. Thus an orifice having a diameter which is ⅔ to ¾ that of the branch pipe will fulfill this requirement.

The distance which the jet must travel will now be considered.

The agitating effect of a jet is highly desirable; however, for purposes of evaluation, we can consider the distance traveled by the jet to be an index of its effectiveness. When the jet which issues from the end of the jet nozzle has traveled a certain distance, it is turned at an abrupt angle and becomes a rising current. We shall call the point at which it is turned its point of arrival. The ratio of this distance and the diameter of the nozzle (i.e., the branch pipe) is expressed in relation to the dynamic pressure of the jet at the nozzle in FIG. 9(A).

In this graph, the relationship between the distance Lj traveled by the jet and the dynamic pressure Pdn of the jet is obtained by (2).

$$Lj = Dn \times (0.72\ Pdn + 12) \qquad (2)$$

where Lj is the distance the jet travels from the end of the nozzle [m], Dn is the diameter of the nozzle [m], and Pdn is the dynamic pressure of the jet from the nozzle [kPa].

The above results were obtained using water. When a saline solution was used, a tendency was observed for the distance to become longer.

Thus if the orifice has a diameter which is ⅔ to ¾ that of the branch pipe, and the oxidation load is relatively small, the air sucked in through an air pipe at a depth of 3 m will be able to oxidize the water, and no blower will be needed. The flow rate at which the air can be formed into bubbles is related to the flow rate at the orifice. At a rate of 8 to 10 m/sec, the flow rate of the air is equal to that of the liquid. At 12 m/sec, it is 1.3 times the rate of the liquid. Thus a desirable flow rate at the orifice would be at least 8 m/sec. The upper limit for smooth bubble formation would be 14 m/sec.

If the oxidation capacity occurs only in the range of the air bubbles, it will increase in proportion to the standard areal velocity of the floor of the tank. Additional air will not increase the effect. The capacity to supply air and convert it to bubbles will vary with the diameter of the orifice. A diameter from ⅔ to ¾ that of the branch pipe is ideal. The distance to be traveled by the jet in this pipe will depend on operating conditions, but it will generally be at least 15 times the diameter of the pipe. This will impart sufficient power to the jet flowing from the mouth of the pipe into the collection tank. When the jet from the end of the said branch pipe, which is angled slightly downward, has traveled a certain distance the arrival distance), it turns at an acute angle to form a rising current which maintains an agitating flow in the collected liquid.

FIG. 9(B) shows the relationship between the flow rate of the liquid and the discharge pressure when a blower is used and when the air is drawn in by creating an orifice 100 mm in diameter.

As can be seen in the graph, the discharge pressure of the liquid tends to increase with the flow rate of the air. However, a large-scale increase in pressure is not to be expected. There is virtually no difference in the distance which must be traveled whether the air is brought in by a blower or by automatic suction. This result serves to verify the effect of the invention.

INDUSTRIAL APPLICABILITY

As has been described above, this invention mitigates the erosion of the interior surfaces of the pipes which circulate the absorption liquid which occurs over a long period of operation. It allows the length of the branch pipe from the end 4a of the air pipe to collection tank 2 to be kept between 3 D and 10 D, thus allowing the desulfurizing equipment to be made smaller and at a lower cost.

More specifically, the invention disclosed in claim 5 of this application employs a method to suck air automatically, which eliminates the need for power to inject the air. When compared with any of its predecessors with respect to its ability to form air bubbles, the converted cost of power is superior. Without using any agitator at all, this invention provides the same high oxidation capacity as a method which uses a rotating arm (air-blowing device B). It allows the device to be mounted on the side of the tower, so there is a high degree of freedom of placement. The device oxygenates the absorption liquid by spraying a jet of liquid-vapor mixture into the liquid from the wall of the tank.

What is claimed is:

1. A wet-gas desulfurizing apparatus which removes oxides of sulfur from combustion exhaust gas by scrubbing the combustion exhaust gas with an absorption liquid which contains an alkali, said apparatus comprising:

- a branch pipe for circulating the absorption liquid, said branch pipe extending into a collection tank through a wall of said collection tank and having a discharge end, which discharges the circulating absorption liquid into the absorption liquid in the collection tank, and an internal diameter D; and
- an air-blowing pipe for injecting air into said branch pipe, wherein an internal diameter of said air-blowing pipe is smaller than said internal diameter D of said branch pipe, said air-blowing pipe is inserted all the way into said branch pipe until the free end of said air-blowing pipe reaches the further side of said branch pipe so that a central axis of said air-blowing pipe meets with a central axis of said branch pipe by a perpendicular angle or some other angle, and wherein an upstream side of said air-blowing pipe is streamlined for stabilizing a cavity of the circulating absorption liquid which is generated at a downstream side of said air-blowing pipe and further minimizing pressure fluctuations in the absorption liquid, and the downstream side of said air-blowing pipe which opens in said branch pipe is configured as a semicircular trough facing downstream towards the collection tank so that small air bubbles are formed in the cavity and the small air bubbles are effectively dispersed into the circulating absorption liquid, and an insertion point of said air-blowing pipe into said branch pipe is located between 3 D and 10 D from the discharge end of said branch pipe for maximizing the efficiency of oxidizing the circulating absorption liquid.

2. A wet-gas desulfurizing apparatus according to claim 1, wherein said end of said air-blowing pipe inserted into said branch pipe has an internal diameter of about 0.4 D to 0.7 D.

* * * * *